Patented May 25, 1954

2,679,532

UNITED STATES PATENT OFFICE 2,679,532

ACID HYDROLYSIS OF NEOMYCIN

Byron E. Leach, Kalamazoo, Mich., assignor to The Upjohn Company, Kalamazoo, Mich., a corporation of Michigan No Drawing. Application October 27, 1950, Serial No. 192,604

2 Claims. (Cl. 260—563)

This invention relates to an aminoalcohol having the empirical formula $C_6H_{14}N_2O_3$ or a multiple thereof.

The product of this invention can be obtained by the acid hydrolysis of the antibiotic neomycin followed by isolation from the reaction mixture and purification as is hereinafter described in greater detail.

The aminoalcohol of this invention thus obtained is an optically active, white crystalline solid, very soluble in water and insoluble in ether which loses its ability to rotate plane polarized light when heated to 247–250 degrees centigrade without apparent liquefaction. It is strongly basic as a result of its primary amino groups, forming salts with weak mineral and organic acids as well as strong acids. The usual derivatives of amino groups such as amides and the like can be prepared by methods known to the art. Titration with standardized acid indicates a neutral equivalent of $82\pm1$. The hydroxyl groups which are present undergo reactions usual for such group such as esterification and the like. When heated on a Kopfler micro hot-stage melting point apparatus the aminoalcohol darkens when heated above 250 degrees centigrade but neither melts nor decomposes at temperatures up to 345 degrees centigrade. When heated in a capillary tube it decomposes at 256–257 degrees centigrade. It can be sublimed without decomposition when heated to 250–260 degrees centigrade under a pressure of twenty microns of mercury absolute. The aminoalcohol reacts with two moles of periodate per equivalent weight in sixteen hours at room temperature, with formaldehyde being one of the reaction products. When reacted with benzoyl chloride in the presence of alkali at room temperature (Schotten-Baumann reaction) a polybenzoyl derivative is obtained wherein the benzoyl groups are attached to both oxygen and nitrogen. Alkaline hydrolysis of the polybenzoyl derivative in boiling methanol gives an N-dibenzoyl derivative, which, after crystallization from methanol, melts at 328–330 degrees centigrade and has an optical rotation $[alpha]_D^{25}$ of plus 66 degrees. This dibenzoyl derivative reacts with one mole of periodate per equivalent weight in eighteen hours at room temperature, the optical rotation of the solution diminishing almost to zero.

The infrared spectra indicates the possible presence of —OH, —NH—, C—O or C—N bonds and the absence of a carbonyl group C=O such as would be present in an aldehyde, ketone, carboxyl, ester or lactone group. A band is observed at 1603 cm.$^{-1}$, which coupled with the absence of a band at 1510 cm.$^{-1}$ indicates that the compound is not a typical polyamide.

The aminoalcohol of this invention is an active bacteriostatic agent, inhibiting the growth of various microorganisms in vitro when diluted as given below:

| Organism | Maximum dilution inhibiting growth |
|---|---|
| Br. bronchiseptica | 1/333,000 |
| S. aureus | 1/7,700,000 |
| E. coli | 1/1,000,000 |
| B. subtilis | 1/1,000,000 |
| B. schottmuelleri | 1/1,000,000 |
| E. typhosa | 1/1,000,000 |
| K. pneumonia | 1/6,000,000 |
| Proteus vulgaris | 1/2,000,000 |
| M. tuberculosis | <1/3,300,000 |
|  | 1/200,000 |

The acute intravenous toxicity $LD_{50}$ in mice of the aminoalcohol of this invention is approximately 320 milligrams per kilogram and its acute subcutaneous toxicity, $LD_{50}$ in mice, is approximately 1250 milligrams per kilogram. Mice have tolerated 900 milligrams per kilogram per day for fourteen days of this aminoalcohol when administered subcutaneously without noticeable toxic effects.

The antibiotic neomycin, from which the compound of this invention is derived, can be prepared by the culture of *Streptomyces fradiae* (3535) on suitable nutrient media and isolated according to procedures known to the art (Waksman Archives Biochem. 24 92 (1949)).

The hydrolysis of neomycin, to give the product of this invention, is preferably carried out by heating under reflux for several hours a solution of neomycin in about six normal sulfuric acid, although other acids such as hydrochloric and phosphoric can be used. After completion of the hydrolysis the sulfuric acid is neutralized by the addition of barium hydroxide and the resulting barium sulfate removed. The clarified solution is passed over a weakly acidic ion-exchange resin in the sodium ion from whose salt forming groups are carboxyl groups such as is manufactured by the Resinous Products Co., Philadelphia, and sold under the designation IRC-50. The strongly basic aminoalcohol of the present invention which is practically all adsorbed by the ion-exchange resin is thus separated from other weakly basic products resulting from the hydrolysis, the latter passing through the column. The resin column containing the desired aminoalcohol is washed with water after which the aminoalcohol is eluted using about one-normal acid.

The eluate can be further purified by the flowing chromatographic technique using activated carbon as the chromatographic agent and water as the developing and eluting agent. One embodiment of the chromatographic procedure contemplates mixing the activated carbon with an inert diatomaceous earth diluent to prevent cracking and channeling of the carbon during use. A water solution of the aminoalcohol is added to the top of the column under pressure which is followed, as solution is withdrawn from the bottom of the column, by water. The course of the amino alcohol chromatogram can be followed by observing the optical rotation, if any, of the eluate. The first appearance of the aminoalcohol of this invention in the eluate is signaled by a change in the rotation of the effluent from zero to a positive value. When the optical rotation again approaches zero it is a sign that most of the aminoalcohol has been removed and the process is stopped. The optically active eluates are then combined, frozen and dried from the frozen state under reduced pressure.

The aminoalcohol can be crystallized from the solid dried material thus obtained by dissolving the solid in concentrated (28 percent) ammonium hydroxide solution dilution with methanol and the addition of ammonia gas to the solution until crystallization begins. The solution is then cooled below room temperature, the crystalline aminoalcohol separated which after washing with methanol and drying has the physical and biological properties previously given.

The following examples illustrate in greater detail certain preferred methods and embodiments of the present invention.

*Example 1.—Preparation and purification of the aminoalcohol*

A solution of 500 grams of neomycin sulfate dissolved in 2400 milliliters of six normal sulfuric acid was heated under reflux for seven hours, considerable charring occurring during this hydrolysis. The reaction mixture was allowed to cool overnight and then diluted to approximately six liters with water. The excess sulfuric acid was removed and the pH of the solution adjusted to 7.5 by the addition of solid barium hydroxide, two to three kilograms being required. The barium sulfate was removed by filtration, the precipitate washed with water and the filtrate and washings combined. There was thus obtained 11.6 liters of solution containing 273 grams of solids. A column of a carboxylic acid ion exchange resin in the sodium ion form (IRC-50) two inches in diameter and eighteen inches deep was prepared. The 11.6 liters of solution was passed over this column at a flow rate of ten milliliters per minute. A constant amount of activity, 1000 micrograms per milliliter as determined by the B. subtilis plate assay using neomycin as a standard, came through the resin column, with the main portion of the active material being removed from solution by the resin. The resin was washed with water and then eluted with 1.2 normal hydrochloric acid, the greater part of the activity appearing in the first 1300 milliliters of eluting solution passing through the column. The weight of the solid material thus obtained was 143 grams.

A four inch glass column was packed with an intimate mixture of 1430 grams of heat activated, acid washed wood charcoal (Darco G-60) and 1430 grams of a diatomaceous filter aid (Dicalite), the liquid holdup of the column as thus prepared being 6200 milliliters. The 1300 milliliters of solution containing 143 grams of solids obtained above was poured on the top of the carbon column and the column developed with distilled water. The flow rate through the column was 25 milliliters per minute using twelve pounds per square inch of air pressure applied to the top of the column. The eluates were collected from the bottom of the column according to the following table:

*Carbon chromatogram on bioactive fraction from neomycin hydrolysates*

| Fraction Number | Vol. ml. | pH | Total Grams Solids | alpha Observed | $[\alpha]_D^{25}$ |
|---|---|---|---|---|---|
| 0 | 1,280 | 6.7 | 143 | | |
| 1 | 5,525 | | 1.08 | 0 | |
| 2 | 300 | 7.0 | 3.48 | 0 | |
| 3 | 300 | 6.9 | 6.21 | 0 | |
| 4 | 300 | 6.9 | 6.60 | 0 | |
| 5 | 300 | 6.6 | 7.05 | 0 | |
| 6 | 300 | 4.9 | 18.60 | +3.90 | +66.4 |
| 7 | 300 | 4.8 | 24.60 | +6.70 | +86.1 |
| 8 | 300 | 4.8 | 20.10 | +5.48 | +86.1 |
| 9 | 300 | 4.9 | 12.60 | +3.50 | +83.5 |
| 10 | 300 | 5.0 | 7.71 | +2.14 | +87.8 |
| 11 | 300 | 5.1 | 4.74 | +1.32 | +88.0 |
| 12 | 300 | 5.2 | 1.77 | +0.51 | +91.0 |
| 13 | 300 | 5.4 | 0.90 | +0.25 | +87.7 |
| 14 | 300 | 5.5 | 0.66 | +0.19 | +91.0 |
| 15 | 300 | 5.5 | 0.57 | +0.14 | +77.7 |
| 16 | 300 | 5.6 | 0.48 | +0.11 | +72.5 |
| 17 | 4,000 | | 2.72 | | |
| Totals | | | 119.87 | | |

Fractions 6–17 were combined, frozen and dried from the frozen state under reduced pressure to yield 89.5 grams of solid material.

A 43.8 gram aliquot of the above solid material was dissolved in fifty milliliters of concentrated ammonia water and diluted to four liters with methanol. Dry ammonia gas bubbled into this solution until crystallization had begun and then cooled in a refrigerator overnight. (Based on the titration curve the most favorable pH for crystallization of the free base was found to be 10.7). The crystals were collected, washed thoroughly with anhydrous methanol and dried under reduced pressure to yield 27.3 grams of a white crystalline solid aminoalcohol having an $[\alpha]_D^{25}$ of +121.3 degrees (C, 0.5 percent in water), which lost its ability to rotate the plane of polarized light but did not become liquefied when heated to 247–250 degrees centigrade. Upon heating to higher temperature the aminoalcohol gradually darkened but neither melted nor decomposed when further heated up to a temperature of about 345 degrees centigrade. In a capillary tube the aminoalcohol decomposed at 256–257 degrees centigrade.

Analysis for $C_6H_{14}N_2O_3$—Mol. wt. 162.19:
 Calcd: C, 44.43; H, 8.70; N, 17.28
 Found: C, 44.79; H, 8.10; N, 17.10

Molecular weight as determined cryoscopically in beta-naphthol 165 and 177.

This product when treated by the down flow paper chromatographic technique using a solvent consisting of fifty percent normal butanol, 25 percent acetic acid and 25 percent water by volume, gave only one ninhydrin colored zone with RF values ranging from 0.08 to 0.10 indicating that the material thus obtained was but a single chemical entity.

*Example 2.—N-di-benzoyl derivative*

A two gram sample of the material obtained in Example 1 was dissolved in 100 milliliters of water to which 17.4 grams of benzoyl chloride and 12.0 grams of sodium hydroxide was added. The solution was stirred for one hour after which time the precipitate which had formed was collected. This product which is a mixture of the oxygen and nitrogen polybenzoyl derivatives of the aminoalcohol obtained in Example 1 was dissolved in 120 milliliters of methanol which had been made alkaline by the addition of six milliliters of saturated sodium hydroxide solution. This alkaline methanol solution was heated under reflux for four hours, filtered, neutralized to pH 6.85 with concentrated hydrochloric acid and again filtered. The filtrate was evaporated to dryness under reduced pressure and the residual solid thoroughly triturated with ether and water. The solid residue was dissolved in 200 milliliters of boiling methanol, filtered and added to one liter of hot water. Crystallization began immediately and after standing at room temperature for twenty-four hours the crystals were collected, washed with water and dried whereupon 3.14 grams of the N-dibenzoyl derivative melting at 322–325 degrees centigrade (microblock) were obtained. After recrystallization from a mixture of methanol and water the N-dibenzoyl derivative melted at 328–330 degrees centigrade, $[alpha]_D^{25}$=plus 66 degrees (C=0.5 percent in methanol).

Analysis for $C_{20}H_{22}O_5N_2$—Mol. wt. 370.4:
    Calcd: C, 64.86; H, 6.00; N, 7.58
    Found: C, 64.80; H, 5.71; N, 7.51

Molecular weight as determined cryoscopically in beta-naphthol 365 and 393.

*Example 3—Penta-acetyl derivative*

One gram of the aminoalcohol from Example 1 was suspended in 75 milliliters of pyridine and 25 milliliters of acetic anhydride added. The mixture was warmed on a steam bath to 70–80 degrees centigrade for thirty minutes after which it was allowed to stand for four days at room temperature. The pyridine and excess acetic anhydride were removed under reduced pressure and the residue dissolved in 42.5 milliliters of chloroform. The chloroform solution was passed over a column of aluminum oxide one inch in diameter containing thirty grams of aluminum oxide. The column was developed with two percent methanol in chloroform. The main fraction was evaporated to dryness, and the amorphous residue dissolved in hot ethyl acetate. Upon cooling the ethyl acetate solution 1.4 grams of the crystalline penta-acetyl derivative of the aminoalcohol was obtained. Crystallization from a mixture of 75 parts of ethyl acetate and 25 parts of methyl cyclohexane gave crystals of the penta-acetate melting at 261 degrees centigrade.

Analysis for $C_{16}H_{24}N_2O_8$—Mol. wt. 372.37:
    Calcd: C, 51.61; H, 6.49; N, 7.52; O-acetyl 34.7; Total acetyl 55.1
    Found: C, 52.08; H, 6.62; N, 7.68; O-acetyl 34.0; Total acetyl 48.1

Molecular weight as determined cryoscopically in beta-napthol 361 and 387.

It is to be understood that the invention is not to be limited to the exact details of operation or exact reagents shown and described, as obvious modifications and equivalents will be apparent to one skilled in the art, without departing from the spirit and scope of the invention.

I claim:

1. A method for the preparation of an aminoalcohol having an optical rotation of $[alpha]_D^{25}$ of about plus 121.3 degrees, a decomposition point when heated in a capillary tube of about 256–257 degrees centigrade, a neutral N-benzoyl derivative melting at about 238–330 degrees centigrade and a pentacetate melting at 261 degrees centigrade comprising hydrolyzing neomycin by heating under reflux with six normal sulfuric acid, neutralizing the excess acid and removing the sulfate ion with barium hydroxide, adsorbing the product from the resulting aqueous solution on a carboxylic acid ion exchange resin in the sodium salt cycle, eluting with aqueous mineral acid, chromatographing on activated carbon with water as the developing agent and crystallizing from methanol made alkaline with ammonium hydroxide.

2. In a process for the purification of the amino alcohol described in claim 1 the step of crystallizing said amino alcohol from aqueous methanolic ammonia having a pH of about 10.7.

References Cited in the file of this patent

UNITED STATES PATENTS

| Number | Name | Date |
|---|---|---|
| 2,557,560 | Peck | June 19, 1951 |

OTHER REFERENCES

Swart et al., Arch. Biochem., vol. 24, pp. 92–103 (1949).

Van Slyke et al., J. Biol. Chem., vol. 133, pp. 287–288 (1940).

Peck et al., J. Am. Chem. Soc., vol. 71, pp. 2590–2591 (1949).